United States Patent [19]

Burroughs

[11] 4,297,916
[45] Nov. 3, 1981

[54] CHAIN TIGHTENER ATTACHMENT

[76] Inventor: Elvin O. Burroughs, 81650 Lost Creek Rd., Dexter, Oreg. 97431

[21] Appl. No.: 7,771

[22] Filed: Jan. 29, 1979

Related U.S. Application Data

[63] Continuation-in-part of Ser. No. 824,857, Aug. 15, 1977, abandoned.

[51] Int. Cl.³ .............................................. G05G 1/00
[52] U.S. Cl. .................................. 74/544; 16/114 R; 81/177 A
[58] Field of Search ................. 74/524, 526, 544, 546; 81/177 A, 119; 16/114 R; 254/DIG. 3

[56] References Cited

U.S. PATENT DOCUMENTS

| | | | |
|---|---|---|---|
| 1,829,467 | 10/1931 | Atkinson | 16/114 R |
| 2,490,739 | 12/1949 | Nesbitt | 81/177 A |
| 2,652,736 | 9/1953 | Kiene | 81/177 A |
| 2,986,054 | 5/1961 | Lurie | 81/177 A |
| 3,119,278 | 1/1964 | Simpson | 74/524 |
| 3,657,944 | 4/1972 | Able | 74/544 |
| 3,803,667 | 4/1974 | Rose | 16/114 R |
| 3,813,967 | 6/1974 | De Haven | 81/177 A |
| 3,843,981 | 10/1974 | Verest | 81/177 A |
| 3,878,845 | 4/1975 | Schacht | 128/138 R |
| 3,962,748 | 6/1976 | Michaels | 16/114 R |

Primary Examiner—Kenneth Dorner
Attorney, Agent, or Firm—James D. Givnan, Jr.

[57] ABSTRACT

An attachment slidably engageable with the handle of a chain tightener for supplementing handle leverage. An end fitting on the attachment has an opening along one side through which the handle end may move during release of the tightener to permit separation in a harmless manner. A stop limits the extent of handle insertion into the fitting to contribute toward desired separation.

2 Claims, 6 Drawing Figures

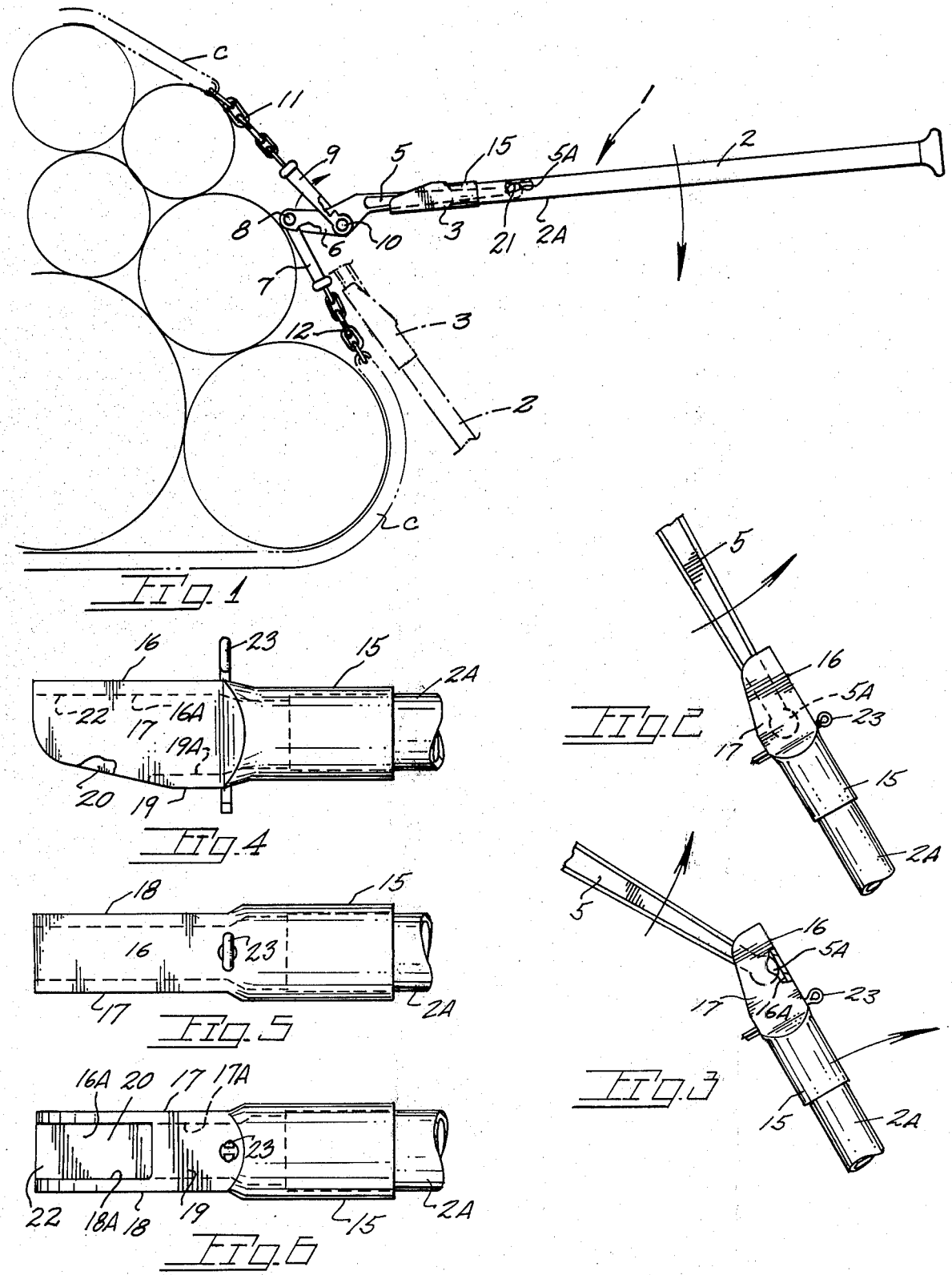

CHAIN TIGHTENER ATTACHMENT

BACKGROUND OF THE INVENTION

The present application is a continuation-in-part application of my copending earlier application of the same title filed Aug. 15, 1977 under Ser. No. 824,857 now abandoned.

The present invention pertains generally to an elongate attachment for temporary engagement with the handle of a chain tightener to facilitate application and safe release of the tightener and an associated chain from about a load.

In wide use presently throughout the logging industry are chain tighteners, sometimes referred to as binders, which are used in conjunction with a loop of chain for securing a load of logs in a bundle for convenient transport. Such chain tighteners typically have components for attachment to opposite end segments of the chain, additional tightener components move, in opposite directions, past a line of force established between the chain ends to an over-center, locked position. Locking and unlocking of the chain tightener requires substantial forces to be exerted in opposite directions on the tightener handle. As an over-center locking feature is utilized in such chain tighteners, unlocking or release of same is often accompanied by sudden and rapid handle movement as tightener components move past the over-center position. Such rapid handle movement may impart injury to the operator, particularly so when a leverage increasing extension is temporarily applied to the tightener handle. Such temporarily applied extensions move rapidly in a wide arc and are subject to axial separation from the tightener handle oftimes resulting in the extension being cast a substantial distance from the load to endanger equipment and workers.

One effort to remedy the problem is found in an extension disclosed in U.S. Pat. No. 3,657,944 wherein same is provided with bearing plates engaging opposite sides of the tightener handle and with transversely disposed plates which cooperate with the enlarged end of a tightener handle to prevent separation of the handle. While the extension disclosed in the aforementioned patent contributes toward a solution to the problem, a problem remains in that disengagement of the tightener handle is not always in a predictable, harmless manner as the handle end has in some instances hung up on an end located plate of same.

SUMMARY OF THE INVENTION

The present invention is embodied within an elongate attachment for temporary attachment to a chain tightener handle and wherein disengagement of the tightener handle and attachment always occurs in a predictable manner.

The present chain tightener attachment includes an elongate member capable at one end to receive the inserted end of a chain tightener handle. To this end of the elongate member is applied a fitting defining an unobstructed internal area and adapted to engage opposite sides of the tightener handle. A stop is insertable within the fitting to limit the inward passage of a chain tightener handle during releasing of the chain tightener. Said stop contributes to harmless separation of the tightener handle and the present attachment.

Important objectives of the present invention include the provision of an attachment for a chain tightener handle which engages a substantial sectional portion of said handle to permit the application of severe forces to the chain tightener without risk of fracturing or bending the tightener handle; the provision of an attachment for a chain tightener adaptable for use on the various different makes of tighteners used in logging and other industries; the provision of an attachment for a chain tightener which includes a stop for limiting handle insertion during unlocking of the chain tightener to assure harmless disengagement of the handle and the attachment regardless of sudden and forceful handle movements, and the provision of an end fitting having a continuous wall coextensive with a pair of attachment sidewalls and having an interior wall surface permitting unobstructed angular separation of the handle end during a tightener unlocking operation.

BRIEF DESCRIPTION OF THE DRAWING

In the accompanying drawing:

FIG. 1 is a side elevational view of the present attachment operatively disposed on the handle of a chain tightener shown during a chain tightening operation;

FIG. 2 is a side fragmentary elevational view of the present attachment in place on a segment of chain tightener handle to initiate an unlocking operation;

FIG. 3 is a view similar to FIG. 2 with the attachment and tightener handle shown just prior to harmless disengagement during an unlocking operation;

FIG. 4 is a side elevational view of the end fitting of the present attachment;

FIG. 5 is a top plan view of FIG. 4, and

FIG. 6 is a bottom plan view of FIG. 4.

DETAILED DESCRIPTION OF THE PREFERRED EMBODIMENT

With continuing attention to the drawing, the reference numeral 1 indicates generally the present attachment which may be of any convenient length to provide the leverage desired.

An elongate member at 2 has a tubular end portion at 2A for the reception of an end segment of the tightener handle as shown in FIG. 1. Secured to the end of segment 2A is an end fitting 3 of the present attachment.

With attention to the typical chain tightener shown, the same includes a handle or lever at 5 normally grasped by the operator and urged downwardly so as to tighten a circuit of chain C about a load. The tightener includes an arm segment 6 bifurcated to receive a link 7 pivoted at 8 to the arm outer end. A clevis at 9 is pivotally attached at 10 to bifurcated arm 6 to provide a fulcrum at 10 about which the inner end of arm 6 travels. To facilitate attachment of the present tightener to a length of load encompassing chain C, hooks at 11 and 12 are attached to the tightener clevis 9 and link 7 by short lengths of chain with the hooks thereon being engageable with selected chain links of chain C. From the position shown in FIG. 1, continued downward movement of the tightener handle 5 eventually results in fulcrum or pivot 10 being on the load side of a line of force between the end of tightened chain C to provide an over-center lock with handle 5 coming to rest adjacent lower hook 12.

With attention to the present invention, end fitting 3 is of open construction with a collar portion 15 in place on one end of member 2. Integral with collar portion 15 are a pair of sidewalls 17 and 18 with inner wall surfaces indicated at 17A and 18A. A wall 19 interconnects corresponding edges of the sidewalls 17 and 18 and is truncated to provide an open area 20. Importantly, a continuous wall 16 is oppositely disposed from truncated wall 19 and in distinction thereto interconnects sidewalls 17 and 18 along their entire length as wall 16 is coextensive therewith. Continuous wall 16 has an inwardly disposed continuous surface 16A along which handle end 5A may slide during a tightener releasing operation as later described. Inner wall surfaces 16A through 19A define an unimpaired opening into which the handle end may be axially inserted. In tightening chain C about the load, the chain tightener handle 5 is positioned as shown in FIG. 1 such being inserted within the wall defined opening and into elongate member 2 whereat a first abutment 21 occurs between handle end 5A and the interior of the elongate member. A second abutment occurs at 22 such taking place at or near the outer end of continuous wall 16 to provide widely spaced apart, load bearing surfaces which avoid handle breakage common with other chain tighteners.

Insertably engageable with fitting 3 is stop 23 which blocks the fitting interior thereby limiting insertion of handle 5. The stop is engaged with fitting walls prior to initiating a chain tightener release operation such as that shown in FIGS. 2 and 3. In such an operation the attachment is inverted from the FIG. 1 position and the stop inserted prior to engagement with tightener handle 5. During lifting of the chain tightener handle to urge pivot or fulcrum 10 back through the dead center position and away from the load to effect unlocking of the tightener, the handle will be engaged by abutment surface 22 with the end segment of the handle in abutment at 24 on fitting wall 19. In FIG. 3 handle 5 is shown immediately subsequent to unlocking passage through dead center position of pivots 8 and 10 whereafter further upward movement of the handle per the arrow will be with considerable force. Such force exerted against fitting 3 will result in the fitting being disengaged in the arrow indicated direction by reason of handle 5 moving into angular relationship with the attachment axis as permitted by truncated fitting wall 19 and opening 20.

In operation of the present attachment to secure a chain or other flexible member about a load of logs or other assembled articles, the present attachment is slid axially onto the handle 5 to locate forward lip 22 against a sizable cross-sectional portion of the handle while handle end 5A bears at 21 against the remotely disposed portion of tubular segment 2. As aforesaid collar 15 may be extended to receive the handle and if so desired. With the attachment in place, downward force may be exerted on the attachment causing the pivotal connections 8 and 10 to reverse their position (relative to the load) from that shown in FIG. 1 so as to locate fulcrum 10 on the load side of a line of force between the chain ends to provide an over-center type lock for the attachment as is conventional in chain tighteners. During transport of the load shifting of one or more of the bundled articles often occurs to further tension chain C to further tighten the over-center locking arrangement of the chain tightener to the extent that it cannot be released by unaided manual effort exerted on handle 5. In such instances, the present attachment provides additional leverage without risk of injury or risk of forcible handle-attachment separation immediately subsequent to passage of the handle past an over-center position. Passage of handle 5 from a position associated with a dead center alignment of pivot points 8 and 10 and the line of force between the cable ends results in accelerated, forceful upward movement of the handle which results in disengagement of the attachment by reason of the handle end 5A exerting lateral thrust against the continuous wall of the attachment by reason of the handle end 5A exerting a thrust against the interior surface 16A of wall 16 displacing the attachment rearwardly (FIG. 3) while permitting the hand-held, opposite end of the attachment to be easily retained within the operator's grip. Stop 23, as aforesaid, limits the penetration of handle 5 into fitting 3. Truncated wall 19 and open area 20 permit angular displacement of handle 5 relative to the attachment during chain tightener release.

While I have shown but one embodiment of the invention it will be apparent to those skilled in the art that the invention may be embodied still otherwise without departing from the spirit and scope of the invention claimed.

Having thus described the invention what is desired to be secured under a Letters Patent is:

I claim:

1. In an attachment for temporary axial engagement with a pivoted handle of a chain tightener, said attachment increasing leverage of the handle during tightening and loosening of a flexible member coupled to the tightener and extending about a load, said attachment including an elongate rigid member for endwise reception of the chain tightener handle during tightening of the flexible member, said attachment further including a pair of opposed sidewalls disposed at one end of said member and a truncated wall having an opening therein and contiguous with said sidewalls and terminating remotely inwardly from outer extremities of said opposed sidewalls to define an open area, the improvement comprising, a continuous wall extending lengthwise the length of said sidewalls in overlapping relationship with said truncated wall and interconnecting said sidewalls, said continuous wall being substantially perpendicular to the sidewalls and having an inwardly disposed continuous surface along and against which the end of the tightener handle may slide during rapid pivotal handle movement encountered during a tightener releasing operation whereby a segment of said handle moves through said open area while the handle end forcefully displaces the attachment in a lateral direction.

2. The invention claimed in claim 1 wherein said continuous wall defines an opening in alignment with the opening in the truncated wall, the attachment additionally including a pin insertably engageable with the openings in the truncated and continuous walls to limit insertion of the tightener handle during a tightener releasing operation.

* * * * *